Figure 1:
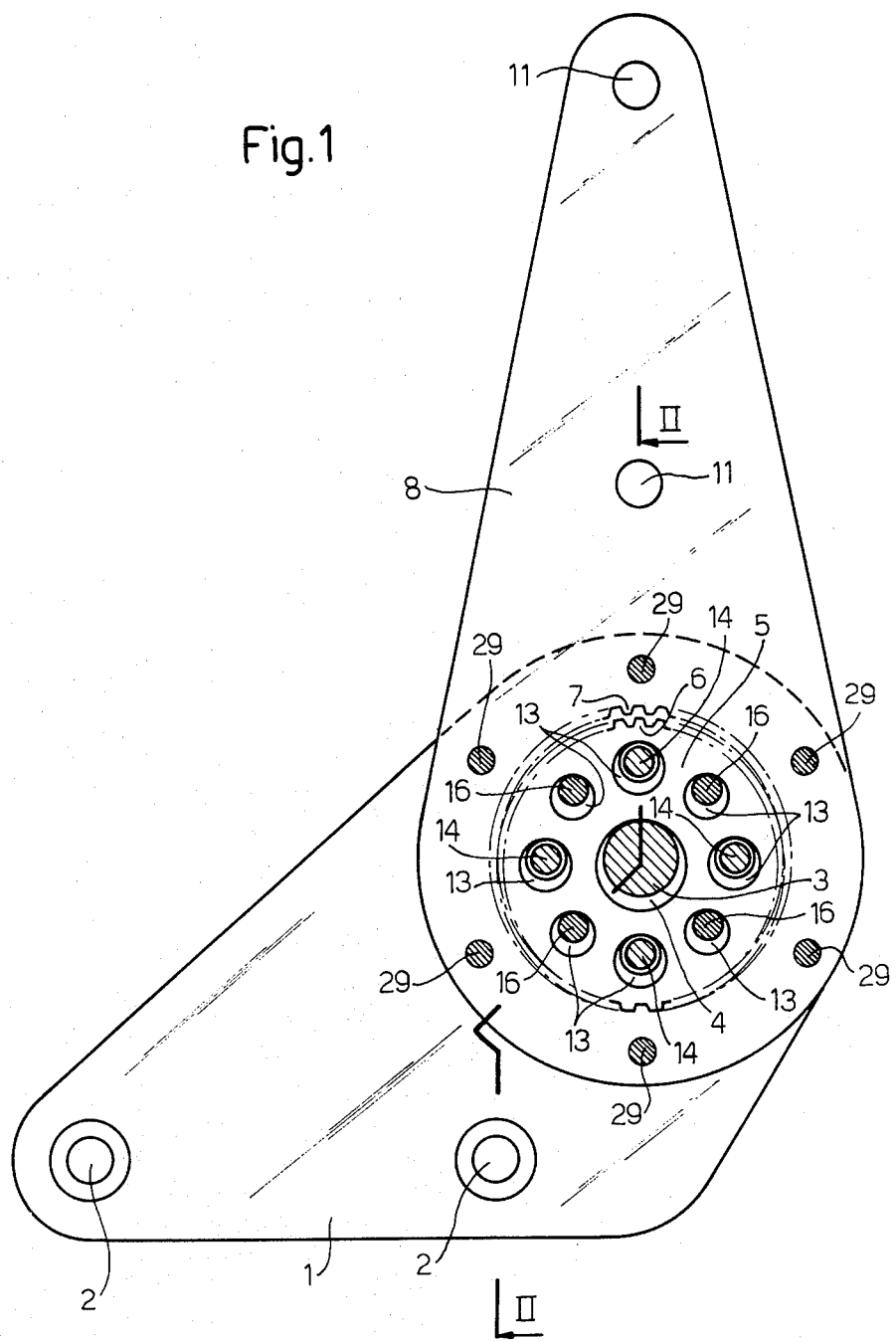

United States Patent [19]

Nardi

[11] 4,304,438

[45] Dec. 8, 1981

[54] DEVICE FOR ADJUSTING THE RELATIVE POSITION OF TWO PARTS

[75] Inventor: Giovanni Nardi, Pisa, Italy

[73] Assignee: Whitehead Motofides S.p.A., Leghorn, Italy

[21] Appl. No.: 50,473

[22] Filed: Jun. 20, 1979

[51] Int. Cl.³ ............................................. A47C 1/025
[52] U.S. Cl. ...................................... 297/362; 16/143
[58] Field of Search ............... 297/362, 361, 366, 373, 297/374; 16/143

[56] References Cited

U.S. PATENT DOCUMENTS 3,423,785  1/1969  Pickles ........................... 297/362 X

FOREIGN PATENT DOCUMENTS

| 2125705 | 4/1972 | Fed. Rep. of Germany | 297/362 |
| 2734565 | 2/1979 | Fed. Rep. of Germany | 297/362 |
| 2734566 | 2/1979 | Fed. Rep. of Germany | 297/362 |
| 890543 | 3/1962 | United Kingdom . | |
| 1042290 | 9/1966 | United Kingdom . | |
| 1335598 | 10/1973 | United Kingdom . | |
| 1365920 | 9/1974 | United Kingdom . | |
| 1372808 | 11/1974 | United Kingdom . | |
| 1427258 | 3/1976 | United Kingdom . | |
| 1445947 | 8/1976 | United Kingdom . | |
| 1479829 | 7/1977 | United Kingdom . | |
| 358822 | 4/1967 | U.S.S.R. . | |

Primary Examiner—William E. Lyddane
Attorney, Agent, or Firm—Merriam, Marshall & Bicknell

[57] ABSTRACT

A device for adjusting the relative position of two parts is described. The device comprises an adjustment pin supported by a first of said two parts and has an eccentric portion on which is mounted a toothed wheel engaging partially with toothing pertaining to the other of said two parts. The number of teeth on said toothed wheel and on said toothing differs by at least one, between said toothed wheel and said first of said parts or a third part rigid therewith there is provided a mutual coupling between at least one plurality of pegs and a corresponding plurality of bores of greater diameter than the diameter of the relative pegs and pertaining respectively to said first of said two parts and to said toothed wheel or vice versa. The main feature of this device is that said other of said two parts is laterally enclosed between said first of said two part and a third part rigid therewith, such that its movement along the axis of said pin is limited.

5 Claims, 2 Drawing Figures

DEVICE FOR ADJUSTING THE RELATIVE POSITION OF TWO PARTS

This invention relates to a device for adjusting the relative position of two parts, particularly for use in seats, preferably motor vehicle seats, for adjusting for example the position of the back relative to the seat.

Said adjustment device is of the type comprising, in general, an adjustment pin operable by a knob and supported by a first of said two parts, and having an eccentric cam portion on which is mounted a toothed wheel provided preferably with external toothing, which engages partly with toothing, preferably an internal ring gear, pertaining to the other of said two parts; the number of teeth on said toothed wheel and on said toothing with which there is partial engagement must differ by at least one, and the two toothings must have the same module and pitch, and furthermore the pitch circle diameters must differ, for example by the module. A mutual coupling is provided between said toothed wheel and the first and said two parts, and is in the form of a plurality of pegs disposed in a corresponding plurality of bores of greater diameter than the diameter of the relative pegs, and pertaining respectively to said first of said two parts and to said toothed wheel, or vice versa. Depending upon which of the two parts is kept fixed, rotation of the adjustment pin causes coaxial rotation about said pin of the mobile part relative to the part kept fixed, with a reduction ratio between the pin rotation and the part rotation. Moreover, because of the particular shape of the teeth, which are generally epicyclic, there is fixed engagement between the two toothings in any position, and relative rotational movement is only possible as a consequence of operating the adjustment pin.

Devices of this type are well known, and are used particularly both as devices for adjusting the position of two parts, and as motion transmission reducers.

The object of the present invention is to provide a device of the described type, which is of very simple and economical construction and assembly, particularly with regard to the members concerned with the overall assembly of the various constituent components and in guiding the relative movement thereof, and which possesses sufficient strength characteristics to ensure reliable operation.

The present invention provides a device for adjusting the relative position of two parts, comprising an adjustment pin supported by a first of said two parts and having an eccentric portion on which is mounted a toothed wheel engaging partially with toothing pertaining to the other of said two parts, the number of teeth on said toothed wheel and on said toothing differing by at least one, between said toothed wheel and said first of said parts or a third part rigid therewith there being provided a mutual coupling between at least one plurality of pegs and a corresponding plurality of bores of greater diameter than the diameter of the relative pegs and pertaining respectively to said first of said two parts and to said toothed wheel or vice versa, wherein the other of said two parts is laterally enclosed between said first of said two parts and a third part rigid therewith, such that its movement along the axis of said pin is limited.

Figure 2:
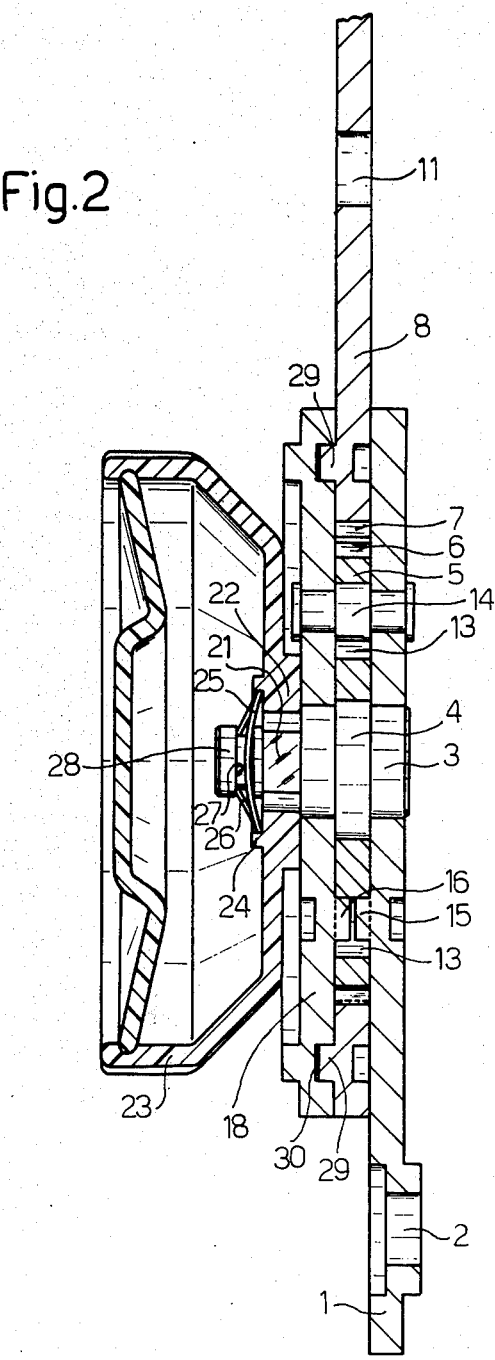

The present invention will be more apparent from the description of one embodiment given hereinafter by way of non-limiting example with reference to the accompanying drawings, in which:

FIG. 1 is a sectional side view of the device of the present invention, with a front part removed; and FIG. 2 is a section on the line II—II through the device of FIG. 1, but showing completely the members missing in FIG. 1.

With reference to FIGS. 1 and 2, the device of the present invention comprises a first part 1 in the form of a substantially triangular plate with two bores 2 for fixing the part 1 to a convenient support (not shown), for example to a seat part.

Towards the upper region of said part 1, there is inserted an adjustment pin 3 which comprises centrally an eccentric cam portion 4 on which a toothed wheel 5 with external toothing 6 is mounted. The wheel 5 partially engages with toothing 7 in the form of an internal ring gear pertaining to a second part 8 in the form of a substantially triangular plate, and also comprising two bores 11 for fixing the part 8 to a convenient support (not shown), for example a back part. The number of teeth on the toothing 7 exceeds the number of teeth on the toothing 6 of the wheel 5 by at least 1, and the two toothings 6 and 7 have the same module and pitch, but are of different pitch circle diameter. A plurality of bores 13 (eight in the case illustrated) are provided in the toothed wheel 5 along a circumference concentric with the central bore in the wheel 5 into which the cam portion 4 is inserted. In said bores 13 there are disposed a plurality of through pegs 14 (four in the case illustrated), alternating with a plurality of pegs 15 and 16 which are disposed, in the case of each alternate bore 13, along the same axis but which orginate in opposite directions from the first part 1 and from a third part 18 in the form of a circular plate disposed such that it laterally encloses the toothed wheel 5 and the second part 8, on the side opposite the side on which the first part 1 is present, so as to limit the movement of the toothed wheel 5 and the second part 8 in the direction of the axis of the pin 3. The pin 3 passes through the third part 18, and then comprises a portion 21 of non-circular section, with which is engaged a corresponding portion 22 of non-circular section pertaining to an adjustment knob 23, which comprises an inner annular ledge 24 acting as a stop for a spring washer 25, with pointed parts 26 which engage against an annular shoulder 27 at one end 28 of the pin 3, and prevent the knob 23 from withdrawing from the pin 3.

The pegs 15 and 16 are advantageously constructed by semi-punching, and the diameter both of the pegs 15 and 16 and of the through pegs 14 is less than the diameter of the bores 13. In particular, the through pegs 14 have end portions of smaller diameter which are inserted, without slack, into the first part 1 and into the third part 18, their ends then being fixed to the parts 1 and 18, advantageously by riveting.

The part 18 is thus rigid with the first part 1, and in cooperation with the part 1 keeps the toothed wheel 5 and the second part 8 laterally enclosed.

A plurality of guide pegs 29 (six in the case illustrated) are provided in a lateral wall of the second part 8 along a circumference concentric with the pin 3, and are housed in an annular slot 30 provided in the third part 18.

The pegs 29 and the slot 30 are formed by semi-punching.

The operation of the adjustment device according to the present invention is as follows. Keeping for example the first part 1 fixed, such that the third part 18 is also fixed, the knob 23 is rotated, and hence the pin 3, to cause the second part 8 to rotate coaxially about said pin 3 relative to the fixed part 1 with a reduction ratio between the rotation of the pin 3 and the rotation of the part 8. In this respect, the eccentric cam portion 4 causes the toothed wheel 5 to rotate eccentrically, and this, by way of the coupling between the fixed pegs 14, 15 and 16 and the bores 13, gives rise to said concentric rotation of the second part 8.

The adjustment device of the present invention has various advantages.

Firstly, it is of extremely simple and economical construction and assembly, in that the mobile members (wheel 5 and part 8) are prevented from making any transverse movement because they are enclosed laterally between two fixed members (parts 1 and 18) which are connected together by through pegs 14 which also constitute part of the plurality of the pegs which couple the toothed wheel 5 with the bores 13.

In addition, the fact that the parts 1, 8 and 18 are in the form of plates means that the overall size of the device in the direction of the axis of the pin 3 can be made very small, and the presence of the part 18, which together with the part 1 encloses the toothed wheel 5 laterally, gives a greater resistance to the toothing 7 than in those cases in which this lateral enclosure is obtained by semi-punching a portion of the part 8.

Finally, the coupling between the pegs 29 and the annular slot 30 provides a good guide for the movement of the second part 8.

It is apparent that modifications which do not leave the scope of the inventive idea can be made to the described embodiments of the present invention.

For example, the plurality of bores 13 can be provided in the part 1 or 18, and the corresponding plurality of pegs 14 can be provided in the toothed wheel 5. The annular slot 30 can be provided in the part 1 or in the part 8, or the plurality of pegs 15 or 16 can be provided alone, etc.

What I claim is:

1. A device for adjusting the relative position of two parts comprising:

two parts (1, 8) in the form of plates;
an adjustment pin (3) rotatably supported by a first (1) of said two parts, including an eccentric cam pin portion (4) immediately adjacent said first part (1);
a toothed wheel (5) with toothing (6) formed around the toothed wheel perimeter, said toothed wheel mounted on said eccentric cam pin portion for rotation immediately adjacent said first part;
said other (8) of said two parts having a substantial annular portion disposed adjacent said first part and surrounding said toothed wheel, said other part (8) including toothing (7) formed as an internal ring gear within said substantial annular portion and engaging said toothed wheel toothing (6) so as to be rotatably driven by said toothed wheel;
the number of teeth on said toothed wheel toothing (6) and on said toothing (7) differing by at least one;
a third part (18) in the form of a plate disposed immediately adjacent said toothed wheel and said other part to laterally enclose said toothed wheel and said substantial annular portion between said third part and said first part;
mutual coupling means between said two parts, said third part and said toothed wheel, including a plurality of bores (13) in said toothed wheel and a corresponding plurality of pegs (14, 15, 16) of lesser diameter than said bores, said pegs extending from said first and third parts through respective bores in said toothed wheel;
said mutual coupling means enabling concentric rotation of said other part (8) about said adjustment pin (3) in response to eccentric rotation of said toothed wheel; and
means for rigidly securing a portion of said plurality of pegs to said first and third parts to rigidly fix said first and third parts together and maintain said toothed wheel and said other part laterally enclosed between said first and third parts, and thereby substantially restrict any movement of said toothed wheel and said other part along the axis of said adjustment pin during rotation thereof.

2. A device as claimed in claim 1, wherein there are comprised means for guiding the movement between said other of said two parts and at least one of said first of said two parts and said third part rigid therewith.

3. A device as claimed in claim 2, wherein said guide means comprise a plurality of pegs arranged to slide in an annular slot, and formed respectively in said other of said two parts and in said first of said two parts or said third part rigid therewith.

4. A device as claimed in claim 1, and fitted between two parts of a seat.

5. A device as claimed in claim 4, wherein said two parts are fixed to a seat part and a back part.

* * * * *